United States Patent

[11] 3,607,849

| [72] | Inventors | Robert Buning<br>Oberlar;<br>Karl-Heinz Diessel, Troisdorf; Siegmund<br>Frick, Oberlar; Gerhard Bier, Troisdorf,<br>all of Germany |
|---|---|---|
| [21] | Appl. No. | 583,005 |
| [22] | Filed | Sept. 29, 1966 |
| [45] | Patented | Sept. 21, 1971 |
| [73] | Assignee | Dynamit Nobel Aktiengesellschaft<br>Troisdorf (Beg Cologne), Germany |
| [32] | Priority | Oct. 2, 1965 |
| [33] | | Germany |
| [31] | | D 48 388 |

[54] BULK COPOLYMERIZATION OF VINYL CHLORIDE AND ONE, TWO-TRANS-DICHLORETHYLENE
5 Claims, 1 Drawing Fig.

[52] U.S. Cl. .................................................... 260/87.5
[51] Int. Cl. .................................................... C08f 1/04,
C08f 1/62, C08f 15/06
[50] Field of Search ........................................... 260/87.5

[56] References Cited
UNITED STATES PATENTS

| 2,715,117 | 8/1955 | Baeyaert ...................... | 260/92.8 |
|---|---|---|---|

FOREIGN PATENTS

| 950,769 | 2/1964 | Great Britain ............... | 260/92.8 |
| 897,009 | 3/1945 | France ......................... | 260/92.8 |
| 1,403,420 | 5/1965 | France ......................... | 260/92.8 |

OTHER REFERENCES

Kitamura, R. et al., Copolymerization of Vinyl Chloride with Trans-1,2, Dichloroethylene, In J. Appl. Polymer Sci., Vol. 9, Pages 1669– 1680 (1965)

*Primary Examiner*—Joseph L. Schofer
*Assistant Examiner*—John A. Donohue, Jr.
*Attorney*—Burgess, Dinklage & Sprung

ABSTRACT: Production of an improved chlorinated polymer by the low temperature bulk copolymerization of vinyl chloride and 1,2-trans dichloroethylene where the polymerization is carried out to at least a 30 percent conversion of monomers at a temperature of −5 to −30° C. and under substantially shearing action.

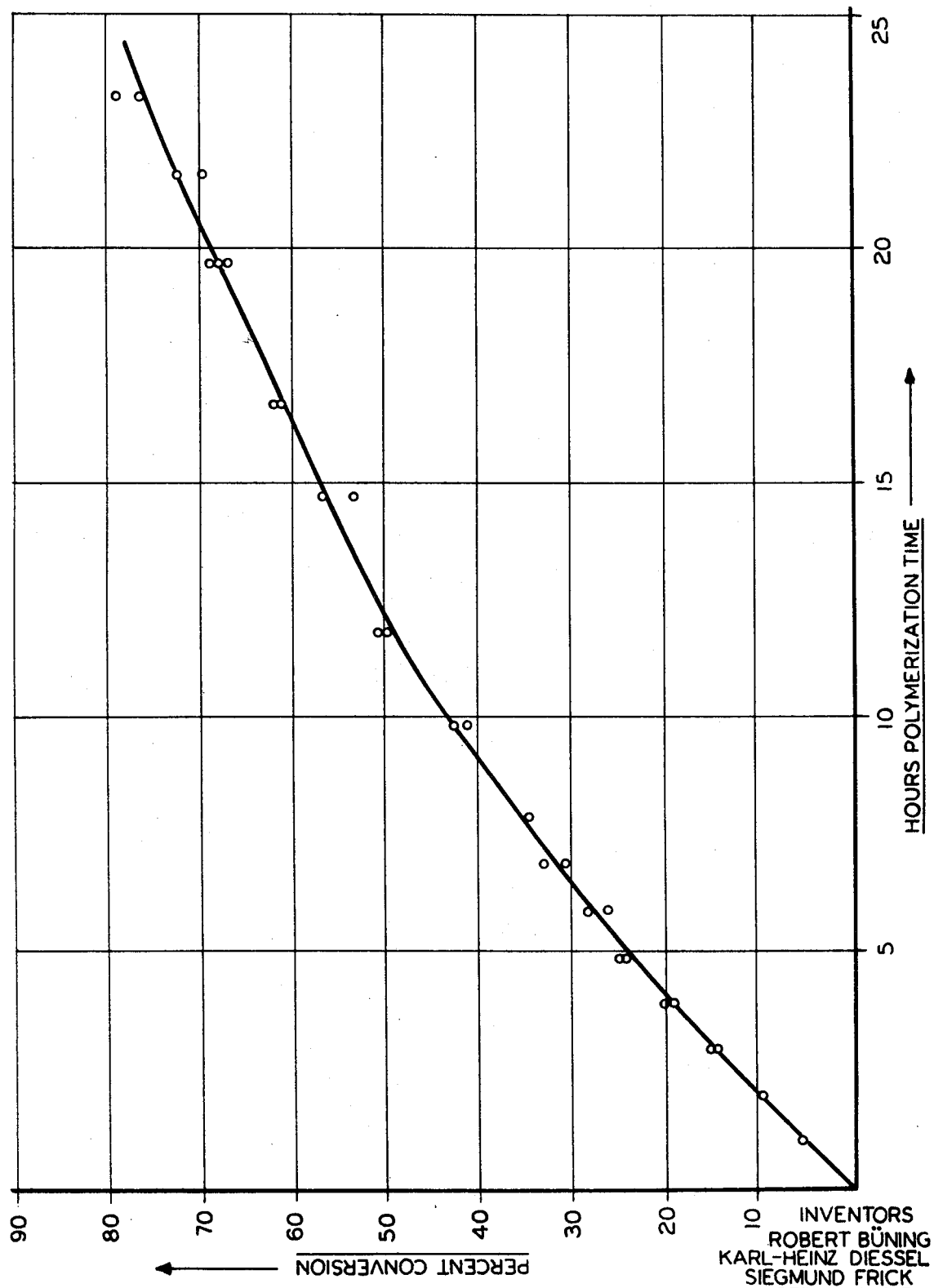

BULK COPOLYMERIZATION OF VINYL CHLORIDE AND ONE, TWO-TRANS-DICHLORETHYLENE

This invention relates to the production of novel copolymers. It more particularly refers to novel copolymers of vinyl chloride and 1,2-trans-dichlorethylene having improved physical properties. It further refers to a novel process of copolymerization.

The bulk polymerization of vinyl chloride and 1,2-trans-dichlorethylene above room temperature is generally known. The copolymers produced by prior methods are, however, not suitable for the manufacture of moldings wherefor these copolymers have not been employed in industry; Cf. J. Appl. Polymer Sci., Volume 9, page 1,675 (1965). Furthermore, although the use of 1,2-trans-dichlorethylene as chain transfer agent in the low temperature polymerization of vinyl chloride is known, copolymers having a desirable content of 1,2-trans-dichlorethylene polymerized therein have not been produced by such use; Cf. British Pat. No. 950,769.

It is therefore an object of this invention to provide a novel copolymerization process.

It is another object of this invention to produce novel copolymer products having desirable physical properties.

Other and additional objects of this invention will become apparent from a consideration of this entire specification, including the drawing and claims appended hereto.

In accord with and fulfilling these objects, one aspect of this invention includes a copolymer of vinyl chloride and 1,2-trans-dichlorethylene containing about 4 to 8 weight percent of the latter.

Production of this novel copolymer is accomplished by copolymerizing vinyl chloride with 10 to 30 percent by weight 1,2-trans-dichlorethylene with known catalysts at temperatures between −5 and −30° C. in rotating cylindrical vessels containing grinding bodies or vessels having shearing agitators with conversions of more than 30 percent by weight. By bulk polymerization there is understood here a type of polymerization in which the polymerization of the monomers takes place in the presence of only slight quantities of auxiliary substances (up to about 20 percent by weight). Auxiliary substances are, for instance, alcohols such as methanol, catalysts, or the like. As grinding bodies there are used, for example, balls and/or rods, and vessels with shearing agitators, for instance, belt mixers or containers with planetary agitators. The catalyst system consists of peroxides such as cyclohexane sulfonyl-acetyl peroxide, hydrogen peroxide or its monosubstitution products, reducing agents, such as ascorbic acid, monoacetyl hydrazine or dihydroxy acetone, and metal salts such as iron salts, copper salts or the like. Metal alkyls such as aluminum triethyl and boron triethyl can also be used.

The copolymers produced according to this invention can be subjected to the difficult working method of deep-drawing and indicate therein properties which are superior to those of the known copolymers of vinyl chloride such as resistance to temperature, reduced formation of cracks, and the like.

Understanding of this invention will be facilitated by reference to the drawing which is a plot of conversion of monomer to polymer in weight percent against polymerization time in hours.

As can be noted from this conversion curve, the copolymerization rate is nearly linear in the present invention even at conversions at 50 percent and more. This is industrially of particular importance for the removal of the heat of polymerization. Furthermore, from the percentage of 1,2-trans-dichlorethylene which is polymerized as a function of the conversion of the mixture, as shown by the Table, infra, can be noted a heterogeneous structure of the copolymer. This is in agreement with the above-described favorable possibilities of processing the copolymer.

EXAMPLE

Eight balls of V 2 A-steel having a diameter of 35 mm. as well as 400 g. of vinyl chloride, 10 g. of 1,2-trans-dichlorethylene, 50 g. methanol, 1.4 g. of ascorbic acid, 1.4 g. of hydrogen peroxide (35 percent) and 0.7 cc. of 1-percent iron-sulfate solution are charged into a cylindrical nickel vessel of a diameter of 110 mm. and a capacity of 2 liters. The vessel is turned on rollers at about 50 revolutions per minute and maintained at −15° C. by a bath of brine. The conversion time curve is shown in the accompanying drawing. The percentages of 1,2-trans-dichlorethylene which are polymerized therein can be noted from the Table.

TABLE

| Conversion in percent by weight | Percent by weight 1,2-trans-dichlorethylene polymerized in the copolymer |
|---|---|
| 10 | 2 |
| 20 | 3 |
| 30 | 4 |
| 40 | 5 |
| 50 | 6 |
| 60 | 7 |
| 70 | 8 |

What is claim is:

1. Process of bulk copolymerizing vinyl chloride and 1,2-trans-dichloro ethylene which comprises mixing said monomers in a polymerization zone; maintaining said zone at about −5° to −30° C. in the presence of a catalyst consisting of at least one peroxide, at least one reducing agent and at least one metal salt while subjecting said polymerization mixture to substantial shearing force; and taking at least a 30 percent conversion of monomers.

2. Process claimed in claim 1, wherein said polymerization mixture is subjected to grinding.

3. Process as claimed in claim 2, wherein said peroxide is at least one selected from the group consisting of cyclohexane sulfonyl acetyl peroxide and hydrogen peroxide.

4. Process as claimed in claim 3, wherein said reducing agent is at least one selected from the group consisting of ascorbic acid, monoacetyl hydrazine and dihydroxy acetone.

5. Process as claimed in claim 3, wherein said metal is at least one selected from iron and copper.